US008386155B2

(12) United States Patent
Huang et al.

(10) Patent No.: US 8,386,155 B2
(45) Date of Patent: Feb. 26, 2013

(54) FAULT ANALYSIS METHOD FOR A LAMBDA PROBE

(75) Inventors: Jia Huang, Altbach (DE); Johannes Scheuerer, Taufkirchen/Vils (DE); Norbert Sieber, Obermichelbach (DE)

(73) Assignee: Continental Automotive GmbH, Hannover (DE)

( * ) Notice: Subject to any disclaimer, the term of this patent is extended or adjusted under 35 U.S.C. 154(b) by 439 days.

(21) Appl. No.: 12/670,417

(22) PCT Filed: Jul. 21, 2008

(86) PCT No.: PCT/EP2008/059537
§ 371 (c)(1),
(2), (4) Date: May 12, 2010

(87) PCT Pub. No.: WO2009/013273
PCT Pub. Date: Jan. 29, 2009

(65) Prior Publication Data

US 2010/0281854 A1 Nov. 11, 2010

(30) Foreign Application Priority Data

Jul. 23, 2007 (DE) ......................... 10 2007 034 251

(51) Int. Cl.
*G06F 19/00* (2011.01)
*G06F 11/30* (2006.01)
*F02D 41/14* (2006.01)
*G01M 15/00* (2006.01)

(52) U.S. Cl. ..... 701/109; 701/114; 702/183; 73/114.73; 123/697

(58) Field of Classification Search .................. 123/672, 123/679, 688, 697, 703; 701/101–103, 107, 701/109, 114; 60/274, 276; 73/23.32, 114.69–114.73; 702/192, 183, 702/185
See application file for complete search history.

(56) References Cited

U.S. PATENT DOCUMENTS 5,090,387 A 2/1992 Mayer et al. .................. 123/479
5,245,979 A 9/1993 Pursifull et al. .............. 123/690
5,462,040 A 10/1995 Krebs et al. .................. 123/688
6,094,975 A * 8/2000 Hasegawa et al. ......... 73/114.71
(Continued)

FOREIGN PATENT DOCUMENTS

DE 3928709 3/1991
DE 19838334 3/2000
(Continued)

OTHER PUBLICATIONS

German Office Action for Application No. 10 2007 034 251.0 (3 pages), Feb. 14, 2008.

(Continued)

*Primary Examiner* — Willis R Wolfe, Jr.
(74) *Attorney, Agent, or Firm* — King & Spalding L.L.P.

(57) ABSTRACT

A fault analysis method for a lambda probe of an internal combustion engine, in particular for detecting a heater input, has the following steps: measurement of an air ratio in the exhaust gas of the internal combustion engine by a lambda probe, control of the air ratio in the exhaust gas of the internal combustion engine by a lambda probe by a lambda controller intervention in accordance with the measured air ratio, and evaluation of the lambda controller intervention in order to detect a fault.

21 Claims, 3 Drawing Sheets

U.S. PATENT DOCUMENTS

| | | | | |
|---|---|---|---|---|
| 6,245,205 | B1 | 6/2001 | Schnaibel et al. | 204/401 |
| 7,269,996 | B2 | 9/2007 | Schnaibel et al. | 73/118.1 |
| 7,497,210 | B2 * | 3/2009 | Okamoto | 123/673 |
| 7,681,565 | B2 * | 3/2010 | Fujiki | 123/673 |
| 7,801,666 | B2 * | 9/2010 | Mitsuda et al. | 701/103 |
| 2005/0000832 | A1 | 1/2005 | Holoch et al. | 205/782 |
| 2009/0057163 | A1 | 3/2009 | Holoch et al. | 205/784.5 |

FOREIGN PATENT DOCUMENTS

| | | |
|---|---|---|
| DE | 10056320 | 5/2002 |
| DE | 102005032456 | 1/2007 |
| EP | 0624721 | 11/1994 |
| EP | 1494025 | 1/2005 |

OTHER PUBLICATIONS

International Search Report and Written Opinion for Application No. PCT/EP2008/059537 (12 pages), Dec. 17, 2008.

* cited by examiner

FAULT ANALYSIS METHOD FOR A LAMBDA PROBE

CROSS-REFERENCE TO RELATED APPLICATIONS

This application is a U.S. National Stage Application of International Application No. PCT/EP2008/059537 filed Jul. 21, 2008, which designates the United States of America, and claims priority to German Application No. 10 2007 034 251.0 filed Jul. 23, 2007, the contents of which are hereby incorporated by reference in their entirety.

TECHNICAL FIELD

The invention relates to a fault analysis method for a lambda probe of an internal combustion engine for detecting a heater input.

BACKGROUND

Modern internal combustion engines for operating motor vehicles feature lambda probes which measure the air ratio (combustion air ratio) in the exhaust gas of the internal combustion engine in order to be able to take account of the air ratio in the open-loop or closed-loop control of the internal combustion engine.

Linear lambda probes are used for this purpose for example, which are raised by an electrical heater to the necessary operating temperature of typically 650° C.-850° C. The desired effective heat output of the electrical heater is mostly set in such cases by a pulse-width-modulated (PWM) control method in which the electrical heater is activated in accordance with a predefined pulse duty ratio alternately with two different voltages of for example 0V (ground) and 14V (battery voltage).

Under specific peripheral conditions undesired electrical connections can be produced between the electrical terminal contacts of the electrical heater and the output contacts of the lambda probe. For example under some circumstances moisture can penetrate into the plug-in connector between the lambda probe and the engine controller. In addition manufacturing faults can also cause the undesired electrical connections between the electrical terminal contacts of the electrical heater and the output contacts of the lambda probe.

Depending on the electrical transfer resistance of the undesired electrical connections such a fault can produce more or less strong effects on the output signal of the lambda probe. Thus the useful signal of the lambda probe is overlaid in the event of such a fault by a noise signal emanating from the pulse width modulated control signal of the electrical heater of the lambda probe, so that the noise signal has a frequency corresponding to the clock frequency of the pulse-width-modulated control signal of the lambda probe.

The fault described here of the lambda probe because of the heater input can significantly adversely affect the function of the lambda controller, since the lambda controller receives an incorrect air ratio as its input signal. Depending on the intensity of the fault the result in such cases can be negative influences on the driving behavior (e.g. jerking) or a deterioration in the exhaust gas values.

The diagnosis of a fault-related heater input for a heated lambda probe is therefore known from the prior art. The known diagnosis methods for detecting a heater input are based on an evaluation of the output signal of the lambda probe, with the evaluation being synchronized with the clock frequency of the pulse-width-modulated control signal of the lambda probe heater. The call-up rate of the diagnosis needed for a reliable fault detection is determined in such cases from the clock frequency of the pulse-width modulated control signal of the lambda probe heater, which typically lies between 10 Hz and 100 Hz.

The disadvantage of the known diagnosis method is thus the fact that, above all at high clock frequencies of the pulse-width modulated control signal of the lambda probe heater, a large computing run time is needed.

A dynamic diagnosis of an exhaust gas probe is known from DE 10 2005 032 456 A1 to detect an ageing-related deterioration of the dynamic behavior of the exhaust gas probe, in which it is also disclosed that the lambda controller intervention can be evaluated. However the detection of a heater input is not known from this publication.

Furthermore DE 100 56 320 A1 and EP 0 624 721 A1 disclose diagnostic methods in conjunction with lambda probes which however likewise do not make it possible to detect a heater input.

A conventional method for detecting a heater input is likewise known from DE 198 38 334 A1. In this case only the output signal of the lambda probe is evaluated which is associated with the known problems.

SUMMARY

According to various embodiments, an appropriately improved fault analysis method for a lambda probe of an internal combustion engine can be provided, with the fault analysis method being designed to make a reliable and simple detection of the heater input possible.

According to an embodiment, a fault analysis method for a lambda probe of an internal combustion engine with a lambda probe heater for heating up the lambda probe, may have the following steps: a) Measuring an air ratio in the exhaust gas of the internal combustion engine by means of the lambda probe, b) Controlling the air ratio in the exhaust gas of the internal combustion engine by means of a lambda controller intervention according to the measured air ratio, c) Detecting a fault-related heater input in which the useful signal of the lambda probe is overlaid by a noise signal because of interference from electrical connections between terminal contacts of the lambda probe heater and output contacts of the lambda probe, and d) Evaluating the lambda probe intervention for detection of the fault-related heater input.

According to a further embodiment, the fault analysis method may further comprise the following steps: a) Comparing the strength of the lambda probe intervention with at least one predefined limiting value, b) Detecting a fault when the strength of the lambda probe intervention exceeds the predefined limit value. According to a further embodiment, the fault analysis method may further comprise the following steps: a) Determining the time gradient of the lambda probe intervention, b) Comparing the gradient of the lambda probe intervention with at least one predefined limiting value, c) Detecting a fault when the gradient of the lambda probe intervention exceeds the predefined limiting value. According to a further embodiment, the fault analysis method may further comprise the following steps: a) Heating-up of the lambda probe by a lambda probe heater with a predefined heat output, b) Changing the heat output of the lambda probe heater if a fault is detected by the evaluation of the lambda controller intervention, c) Repeating the fault detection with a changed heat output to distinguish between a heater input and an undefined fault. According to a further embodiment, a) the lambda probe heater can be activated with a pulse-width-modulated control signal with a predefined pulse duty ratio, and b) the pulse duty ratio of the pulse-width-modulated control signal of the lambda probe heater can be changed to change the heat output of the lambda probe heater. According to a further embodiment, the pulse duty ratio of the pulse-width-modulated control signal can be changed to either 0% or 100% for a fault detection. According to a further embodiment, the fault analysis method may further comprise the following steps: a) Measuring the temperature of the lambda probe during the duration of the change of the heat power of the lambda probe heater, b) Comparing the temperature of the lambda probe with a predefined minimum temperature and/or a predefined maximum temperature, c) Interrupting the evaluation of the lambda controller intervention if the measured temperature of the lambda probe falls below the minimum temperature or exceeds the maximum temperature, d) Changing the heat output of the lambda probe heater during the interruption of the evaluation of the lambda controller intervention in order to adjust the temperature of the lambda probe. According to a further embodiment, the fault analysis method may further comprise the following steps: Debouncing the lambda controller intervention determined. According to a further embodiment, the lambda probe can be a linear lambda probe. According to a further embodiment, the fault analysis method may further comprise the following steps: Storing a fault entry on detection of a fault.

According to another embodiment, an engine controller for an internal combustion engine can be configured to carry out the fault analysis method as described above.

According to yet another embodiment, a program memory with a control program stored therein may, on execution in an engine controller of an internal combustion engine, carry out the fault analysis method as described above.

BRIEF DESCRIPTION OF THE DRAWINGS

Other advantageous developments are explained in greater detail below along with the description of the preferred exemplary embodiments with reference to the figures. The figures show.

DETAILED DESCRIPTION

Figure 1:
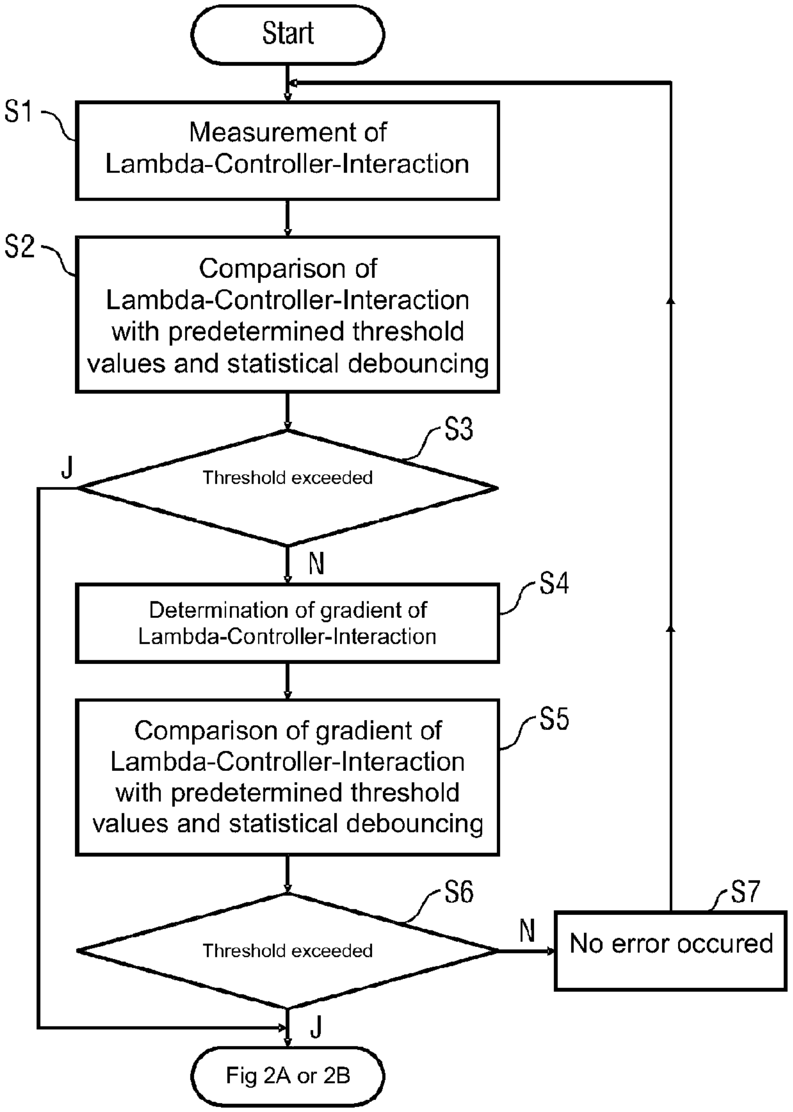
FIG. 1 a flow diagram depicting the evaluation of the lambda controller intervention for fault detection, FIGS. 2A and 2B flow diagrams of two variants of the fault analysis method according to various embodiments for clarifying the cause of the fault.

According to various embodiments, a lambda probe fault leads to a corresponding change of a lambda controller intervention, since the lambda controller attempts by the lambda controller intervention to regulate out fault-related changes in the measured air ratio. A fault in the lambda probe is thus reflected in a corresponding change in the lambda controller intervention which makes it possible to detect faults.

According to various embodiments, the general technical teaching of detecting a heater input for a lambda probe by an evaluation of the lambda controller intervention is provided.

Preferably the strength of the lambda controller input is evaluated within the framework of the invention, by the strength of the lambda controller intervention being compared with at least one predefined limiting value. Within the framework of the fault analysis method according to various embodiments a fault is detected when the strength of the lambda controller intervention falls below the predefined limiting value.

In this case a permitted range of values is preferably predefined for the strength of the lambda controller intervention. A fault is then detected when the strength of the lambda controller intervention departs from the permitted range of values at the top end or the bottom end, which points to a malfunction of the lambda probe, as a result of a heater input for example.

A further option for fault detection consists of the evaluation of the time gradient of the lambda controller intervention. Thus a heater input for a lambda probe is identified as a rule by a highly-dynamic change of the output signal of the lambda probe and by a correspondingly dynamic change of the lambda controller intervention. Preferably the time gradient of the lambda controller intervention is therefore determined and compared to at least one predefined limit value, with a fault being detected when the gradient of the lambda controller intervention exceeds the predefined limiting value.

Preferably a permitted range of values for the time gradient of the lambda controller intervention is also predefined for the gradient evaluation, with a fault being detected when the gradient of the lambda controller intervention departs from the permitted range of values at the upper or lower end.

As well as a heater input however other undesired effects in the system can also lead to a behavior with a similar fault image. In this case, although the fault analysis method outlined above leads to the detection of a fault, it is not easily possible to distinguish a heater input from another fault.

According to further embodiments, it can be clarified during a fault detection whether the detected fault is due to a heater input or has another cause.

To this end the pulse-width-modulated lambda probe heater is temporarily activated with a pulse duty ratio of 0% or 100%, i.e. with dc voltage, in which case no heater input can occur.

Subsequently the fault analysis method according to various embodiments previously described is carried out once more with an evaluation of the strength and/or the gradient of the lambda controller intervention.

If a fault is then still detected with dc voltage at the lambda probe heater, this fault cannot be due to a heater input since this is basically excluded with a dc voltage activation of the lambda probe heater. In this case the engine controller can then presume that the fault is an unspecified one of which the cause requires further clarification.

If on the other hand the new fault analysis for the dc voltage activation of the lambda probe heater no longer detects a fault, it can be assumed that the fault detected during the previous normal pulse-width-modulated activation of the lambda probe heater is due to a heater input.

During the change in the pulse duty ratio of the pulse-width-modulated control signal for the lambda probe heater to 0% or 100% there is the danger of the lambda probe cooling down too far or overheating. During the activation of the lambda probe heater with the changed pulse duty ratio the temperature of the lambda probe is therefore preferably measured and compared with a predefined minimum temperature or a predefined maximum temperature. If the measured temperature of the lambda probe departs from the permitted temperature range defined in this way, the evaluation of the lambda controller intervention is temporarily interrupted and the temperature is then adjusted during the interruption of the evaluation by the lambda probe heater being activated again with a normal pulse-width-modulated control signal.

If the temperature of the lambda probe has then again reached the permitted range of values, the pulse duty ratio of the pulse-width-modulated control signal of the lambda probe heater can be set to 0% or 100% again. This process is to be repeated until such time as a sufficiently long test time has been obtained as required for clarifying the cause of the fault.

During the evaluation of the lambda controller intervention there is preferably a statistical debouncing of the measured values of the lambda controller intervention in order to avoid misdetection.

It should also be mentioned that the fault analysis method according to various embodiments is preferably suitable for a linear lambda probe. However the invention is not restricted to the analysis of faults in linear lambda probes but can basically also be implemented with other types of lambda probe.

Furthermore the various embodiments preferably provide for a corresponding fault entry to be stored during fault detection.

As well as the fault analysis methods described here, according to various further embodiments an engine controller may be configured for executing the inventive fault analysis method and may carry out the fault analysis method during operation.

Finally according to other embodiments a program memory (e.g. ROM: Read Only Memory) may comprise a control program stored therein, which carries out the fault analysis method according to various embodiments when executed in an engine controller of an internal combustion engine.

The fault analysis method according to various embodiments depicted in the figures runs during operation in an engine controller for an internal combustion engine of a motor vehicle alongside other open-loop and closed-loop control processes.

In a first step S1 in this method the current value of the lambda controller intervention is determined, with this involving an adjustment signal of a lambda controller with which the lambda controller attempts to regulate out a deviation of the air ratio in the exhaust gas of the internal combustion engine.

In a further step S2 the strength of the measured lambda controller intervention is compared with predefined limiting values in order to check whether the lambda controller intervention has departed from a permitted range of values. A statistical debouncing is also undertaken here to avoid a misdetection of faults.

In a further step S3 a check is then made as to whether the lambda controller intervention has departed from the permitted range of values.

If it has, a fault with an initially still unspecified cause is present and a branch is made to FIGS. 2A and 2B to clarify the cause of the fault, as will be explained in greater detail with reference to FIGS. 2A and 2B below.

If however the lambda controller intervention has not departed from the permitted range of values, in a next step S4 the time gradient of the lambda controller intervention is determined in order to refine the fault analysis.

In a next step S5 the time gradient of the lambda controller intervention previously determined is then compared with predefined limiting values, with statistical debouncing again being undertaken in order to avoid misdetection.

In a next step S6 another check is made as to whether the time gradient of the lambda controller intervention has departed from the permitted range of values.

Figure 2A:
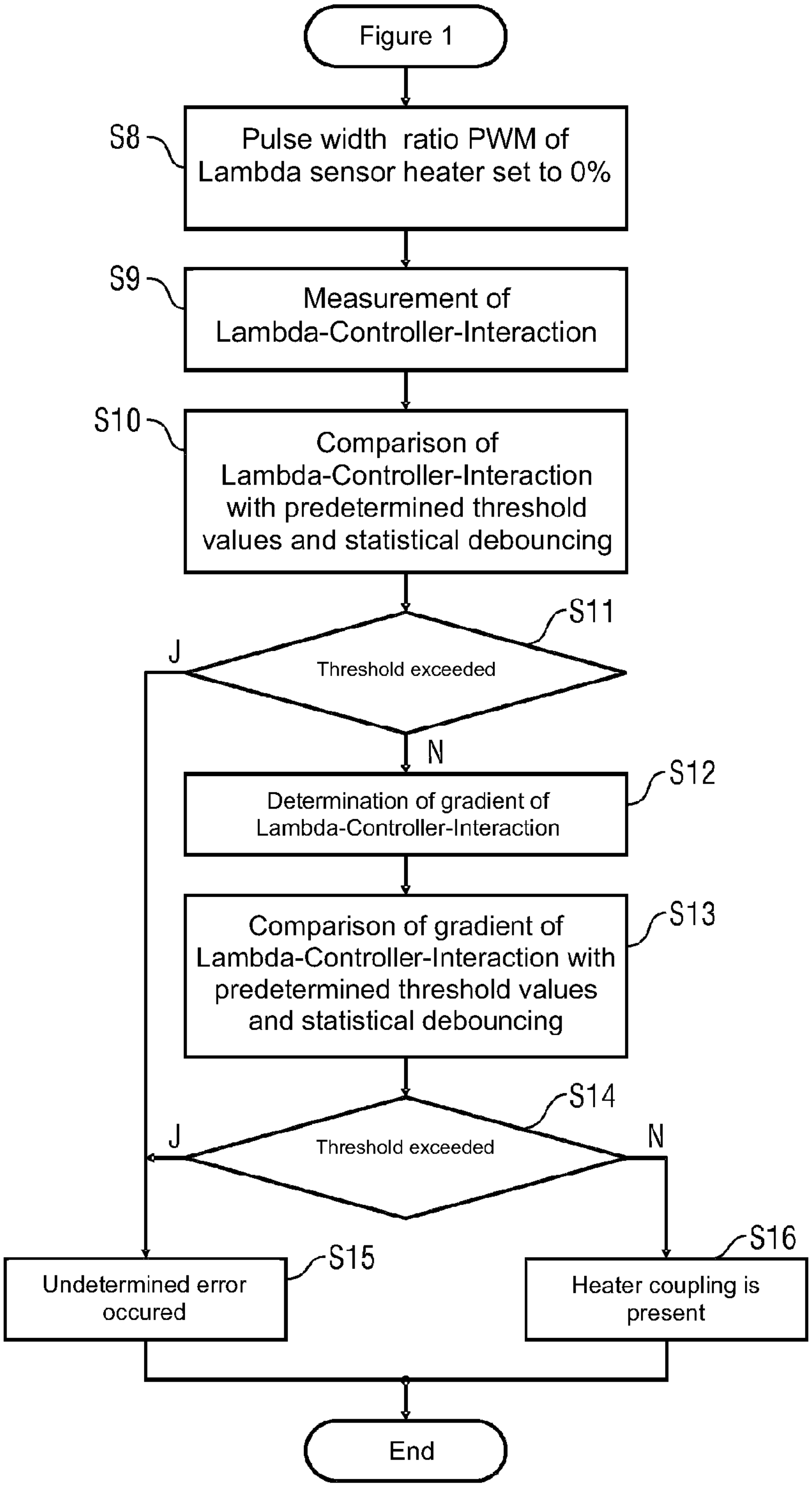
Figure 2B:
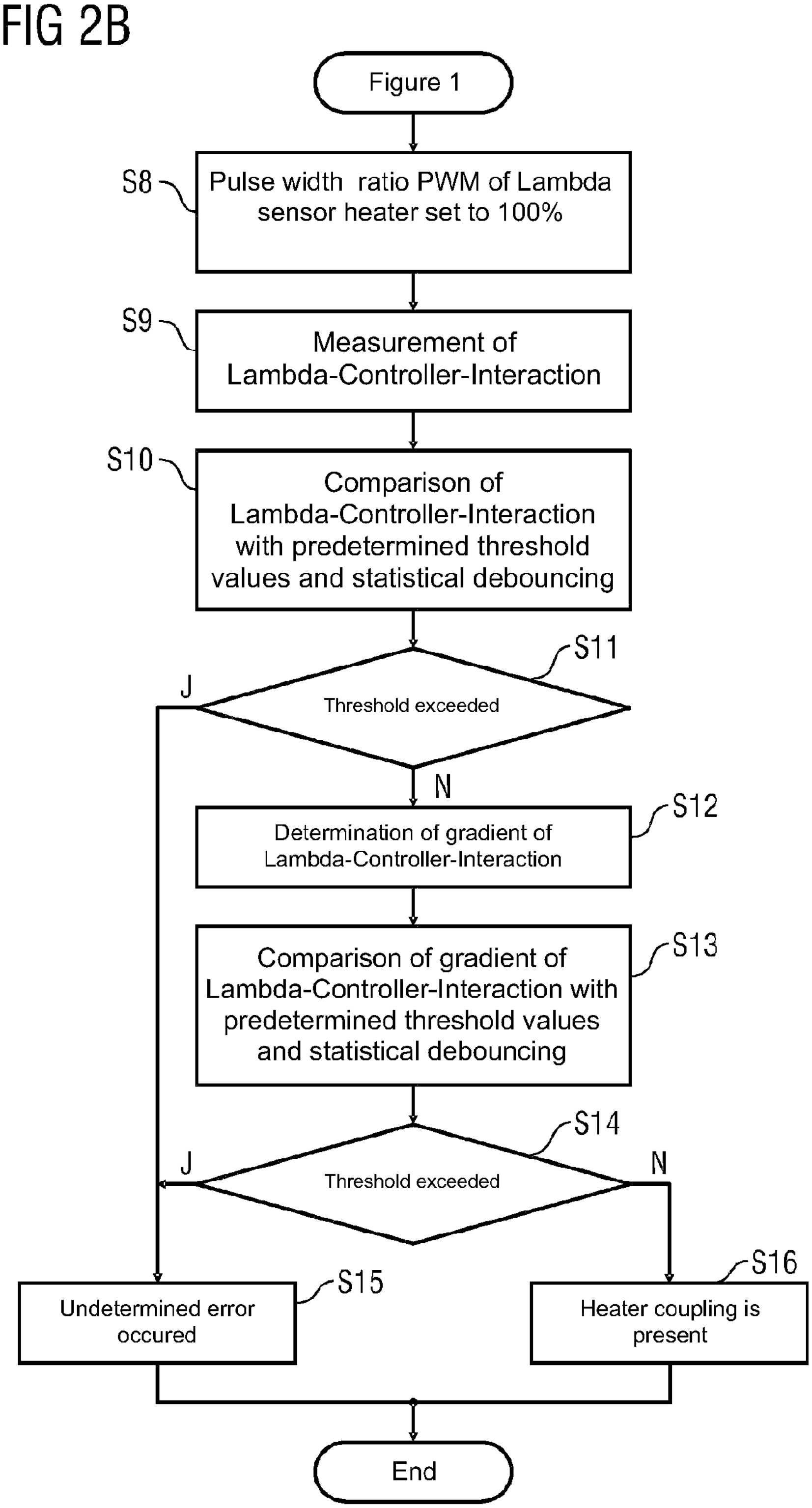

If this is the case, a branch is made to FIG. 2A or 2B where the cause of the fault is further pinpointed.

If one the other hand the time gradient of the lambda controller intervention also lies within the permitted range of values, a branch is made to a step S7 in which it is established that there is no fault present. In this case an corresponding fault entry is stored in the engine controller.

The fault analysis method described here is then continuously repeated in an endless loop during the normal operation of the internal combustion engine.

The variant presented in FIG. 2A of a follow-up section of the fault analysis method according to various embodiments in which the cause of the fault is further pinpointed will now be described below.

To this end the pulse width modulation PWM of the lambda probe sensor is initially set to 0%, i.e. the lambda probe sensor is switched off, which basically excludes a disruptive heater input into the output signal of the lambda probe.

The lambda probe intervention is then subsequently measured in a step S9.

In a following step S10 the strength of the lambda probe intervention is then compared with predetermined limiting values, with a statistical debouncing again being undertaken.

In a step S11 a check is then made as to whether the strength of the lambda probe intervention has departed from the permitted range of values.

If it has, a branch is made to a step S15 in which it is established that the initially only non-specifically determined fault is not attributable to a heater input. Instead a fault entry is stored in step S15 identifying an unspecified fault.

If on the other hand the result of the check in step S11 is that the strength of the lambda probe intervention lies within the permitted range of values, a branch is made to a step S12 where the time gradient of the lambda probe intervention is determined.

In a step S13 the time gradient of the lambda probe intervention previously determined is then compared with predefined limiting values, with a statistical debouncing again being undertaken.

In a subsequent step S14 a check is then made as to whether the time gradient of the lambda probe intervention has departed from the permitted range of values.

If this is the case, a branch is made from step S14 to step S15, since the fault only established non-specifically previously is not to be attributed to a heater input.

On the other hand, if the result of the check in step S14 is that both the strength and also the gradient of the lambda probe intervention lie within the permitted range of values, a branch is made from step S14 to step S16 where a heater input is assumed to be the cause of the fault and a corresponding fault entry is stored.

While the lambda probe heater is switched off in the method section shown in FIG. 2A an ongoing check is made as to whether the temperature of the lambda probe has fallen below the necessary operating temperature. If it has, the method section depicted in FIG. 2A is interrupted and the lambda probe will be heated up again to above the necessary operating temperature. Subsequently the method section depicted in FIG. 2A is then continued until the required test duration is reached.

FIG. 2B shows a method section which is possible as an alternative to the method section in accordance with FIG. 2A.

By contrast with the method section in accordance with FIG. 2A, the pulse width modulation PWM of the lambda probe heater is not set to 0% during the clarification of the fault causes but to 100%, i.e. to dc voltage, so that likewise no heater input is possible.

Subsequently the clarification of the fault cause already described in FIG. 2A is undertaken so that the reader is referred in this regard to the information already given re. FIG. 2A.

A peculiarity of the variant according to FIG. 2B however lies in the fact that there is the danger with a pulse duty ratio of 100% of the lambda probe overheating.

An ongoing check is therefore made during the clarification of the cause of the fault in the method section according to FIG. 2B as to whether the temperature of the lambda probe is exceeding a predefined maximum temperature. If it is, the method section according to FIG. 2B is interrupted and the lambda probe is again activated with a pulse duty ratio of less than 100% to let the lambda probe cool off until the temperature of the lambda probe has fallen below the predefined maximum temperature again. Subsequently the clarification of the fault causes is then continued in the method section according to FIG. 2B.

The invention is not restricted to the exemplary embodiments described here. Instead a plurality of variants and derivatives are possible which likewise make use of the inventive idea and thus fall within the scope of protection.

What is claimed is:

1. A fault analysis method for a lambda probe of an internal combustion engine with a lambda probe heater for heating up the lambda probe, comprising the following steps:

a) Measuring an air ratio in the exhaust gas of the internal combustion engine by means of the lambda probe, b) Controlling the air ratio in the exhaust gas of the internal combustion engine by means of a lambda controller intervention according to the measured air ratio, c) Detecting a fault-related heater input in which the useful signal of the lambda probe is overlaid by a noise signal because of interference from electrical connections between terminal contacts of the lambda probe heater and output contacts of the lambda probe, and d) Evaluating the lambda probe intervention for detection of the fault-related heater input.

2. The fault analysis method according to claim 1, comprising the following steps:

a) Comparing the strength of the lambda probe intervention with at least one predefined limiting value, b) Detecting a fault when the strength of the lambda probe intervention exceeds the predefined limit value.

3. The fault analysis method according to claim 1, further comprising the following steps:

a) Determining the time gradient of the lambda probe intervention, b) Comparing the gradient of the lambda probe intervention with at least one predefined limiting value, c) Detecting a fault when the gradient of the lambda probe intervention exceeds the predefined limiting value.

4. The fault analysis method according to claim 1, comprising the following steps:

a) Heating-up of the lambda probe by a lambda probe heater with a predefined heat output, b) Changing the heat output of the lambda probe heater if a fault is detected by the evaluation of the lambda controller intervention, c) Repeating the fault detection with a changed heat output to distinguish between a heater input and an undefined fault.

5. The fault analysis method according to claim 4, wherein a) the lambda probe heater is activated with a pulse-width-modulated control signal with a predefined pulse duty ratio, and b) the pulse duty ratio of the pulse-width-modulated control signal of the lambda probe heater is changed to change the heat output of the lambda probe heater.

6. The fault analysis method according to claim 5, wherein the pulse duty ratio of the pulse-width-modulated control signal is changed to either 0% or 100% for a fault detection.

7. The fault analysis method according to claim 1, comprising the following steps:

a) Measuring the temperature of the lambda probe during the duration of the change of the heat power of the lambda probe heater, b) Comparing the temperature of the lambda probe with a predefined minimum temperature and/or a predefined maximum temperature, c) Interrupting the evaluation of the lambda controller intervention if the measured temperature of the lambda probe falls below the minimum temperature or exceeds the maximum temperature, d) Changing the heat output of the lambda probe heater during the interruption of the evaluation of the lambda controller intervention in order to adjust the temperature of the lambda probe.

8. The fault analysis method according to claim 1, comprising the following step:

debouncing the lambda controller intervention determined.

9. The fault analysis method according to claim 1, wherein the lambda probe is a linear lambda probe.

10. The fault analysis method according to claim 1, comprising the following step:

Storing a fault entry on detection of a fault.

11. An engine controller for an internal combustion engine, with the engine controller being configured:

a) to measure an air ratio in the exhaust gas of the internal combustion engine by means of the lambda probe, b) to control the air ratio in the exhaust gas of the internal combustion engine by means of a lambda controller intervention according to the measured air ratio, c) to detect a fault-related heater input in which the useful signal of the lambda probe is overlaid by a noise signal because of interference from electrical connections between terminal contacts of the lambda probe heater and output contacts of the lambda probe, and d) to evaluate the lambda probe intervention for detection of the fault-related hearer input.

12. A program memory with a control program stored therein that, on execution in an engine controller of an internal combustion engine, carries out the fault analysis method according to claim 1.

13. The engine controller according to claim 11, wherein the engine controller is further operable:

a) to compare the strength of the lambda probe intervention with at least one predefined limiting value, b) to detect a fault when the strength of the lambda probe intervention exceeds the predefined limit value.

14. The engine controller according to claim 11, wherein the engine controller is further operable:

a) to determine the time gradient of the lambda probe intervention, b) to compare the gradient of the lambda probe intervention with at least one predefined limiting value, c) to detect a fault when the gradient of the lambda probe intervention exceeds the predefined limiting value.

15. The engine controller according to claim 11, wherein the engine controller is further operable:

a) to Heat-up of the lambda probe by a lambda probe heater with a predefined heat output, b) to change the heat output of the lambda probe heater if a fault is detected by the evaluation of the lambda controller intervention, c) to repeat the fault detection with a changed heat output to distinguish between a heater input and an undefined fault.

16. The engine controller according to claim 15, wherein a) the lambda probe heater is activated with a pulse-width-modulated control signal with a predefined pulse duty ratio, and b) the pulse duty ratio of the pulse-width-modulated control signal of the lambda probe heater is changed to change the heat output of the lambda probe heater.

17. The engine controller according to claim 16, wherein the pulse duty ratio of the pulse-width-modulated control signal is changed to either 0% or 100% for a fault detection.

18. The engine controller according to claim 11, wherein the engine controller is further operable:

a) to measure the temperature of the lambda probe during the duration of the change of the heat power of the lambda probe heater, b) to compare the temperature of the lambda probe with a predefined minimum temperature and/or a predefined maximum temperature, c) to interrupt the evaluation of the lambda controller intervention if the measured temperature of the lambda probe falls below the minimum temperature or exceeds the maximum temperature, d) to change the heat output of the lambda probe heater during the interruption of the evaluation of the lambda controller intervention in order to adjust the temperature of the lambda probe.

19. The engine controller according to claim 11, wherein the engine controller is further operable:

to debounce the lambda controller intervention determined.

20. The engine controller according to claim 11, wherein the lambda probe is a linear lambda probe.

21. The engine controller according to claim 11, wherein the engine controller is further operable:

to store a fault entry on detection of a fault.

* * * * *